United States Patent [19]

Lear, Jr. et al.

[11] 4,035,170
[45] July 12, 1977

[54] GRANULAR FILTER

[75] Inventors: Dean Everett Lear, Jr., Scott's Valley; Alan Howard Schmid, Santa Cruz; Henry Ford Harding Wigton, Palo Alto, all of Calif.

[73] Assignee: The United States of America as represented by the Administrator of Environmental Protection Agency, Washington, D.C.

[21] Appl. No.: 647,471

[22] Filed: Jan. 8, 1976

[51] Int. Cl.² .................................. B01D 46/32
[52] U.S. Cl. .............................. 55/267; 55/282; 55/474; 55/479; 165/106; 432/215
[58] Field of Search .................... 55/77–79, 55/98, 99, 474, 479, 282, 302, 301, 283, 267; 165/106; 432/215

[56] References Cited

U.S. PATENT DOCUMENTS

| 1,825,707 | 10/1931 | Wagner, Jr. | 55/79 |
| 2,684,124 | 7/1954 | Hines, Jr. | 55/79 |
| 3,868,237 | 2/1975 | Berz | 55/283 |
| 3,920,427 | 11/1975 | Lachnit | 55/479 |

FOREIGN PATENT DOCUMENTS

| 554,893 | 7/1932 | Germany | 55/290 |
| 216,675 | 6/1924 | United Kingdom | 55/474 |
| 879,216 | 10/1961 | United Kingdom | 55/474 |

Primary Examiner—Bernard Nozick

[57] ABSTRACT

A continuously regenerating granular filter operable at high temperature and pressure includes a filter chamber with a gas inlet and gas outlet. A filter bed in the chamber located between the gas inlet and gas outlet is adapted to hold a filter medium and permit gas to flow therethrough. The filter bed includes inlet means and outlet means for enabling the filter medium to move through the filter bed. The filter also includes filter medium cleaning means for cleaning the filter medium. Filter medium transport means operates to transport the filter means from the outlet means, through the cleaning means and to the inlet means.

14 Claims, 5 Drawing Figures

GRANULAR FILTER

BACKGROUND OF THE INVENTION

The invention described and claimed in this application relates to granular filters and, more particularly, to continuously regenerate granular filters operatable at high temperature and pressure which are particularly suited for cleaning gas used to operate a gas turbine.

With the current shortage of many fuels which have traditionally been used to generate heat and power, electric generating plants using coal with high impurity and ash levels and other solid fuels are playing an ever-increasing role in supplying electric power. Other solid fuels may include, for example, combustible solid wastes such as trash, rubbish, garbage, agricultural residues, and industrial residues. It has been found that gas streams formed by burning such fuels contain a relatively high concentration of fine particles matter which must be removed in order for the system to operate efficiently and effectively. Of particular importance, is a system utilizing a turbine generator in which the hot pressurized gas can be cleaned without significantly lowering the temperature or pressure of the gas.

Different types of filters or separators have been tried, but many have significant drawbacks which prevent them from being used. For example, inertial separators such as cyclones have been found not to be effective in removing micron or sub-micron size particles and since cyclones operate at a relatively high velocity, e.g. 50-150 feet/second, if the particulate material has a tendency to stick to surfaces dense deposits in the cyclone result.

Bag houses, where the gas is channeled through a finely meshed material to filter out the particulate material, are limited to relatively low temperatures because of the material used to form the bag. In addition, bag houses are not effective at velocities greater than 15 feet/min., which would require an excessively large filter area at great cost.

Electrostatic precipitators have found not to be effective because of their relatively large size and complex construction. In addition, electrostatic precipitators consume relatively high amounts of power and are sensitive to electrical properties of the particulate material to be removed from the gas. Although electrostatic precipitators have a relatively high maximum collection efficiency, the overall collection efficiency is not as great because of uneven gas flow distribution and particulate re-entrainment when the plates are cleaned.

It has been found that filters using a granular material as a filter medium offer significant advantages for use in a high temperature and pressure environment where high efficiency cleaning is necessary. However, no granular filters were known which operated continuously and efficiently for long periods of time under such conditions of high pressure and temperature.

SUMMARY OF THE INVENTION

A granular filter is provided, in accordance with the invention, which operates effectively at high temperature and pressure and which solves the problems discussed above.

The filter is of relatively small size and by nature of its operation couples high filtering efficiency with maximum practicable protection to downstream equipment from ash from combustion of the solid fuel and from small particles of the filtering medium entrained in the flowing gas, which would cause deposit buildup and erosion to the turbine blades.

The preferred filter medium is a high temperature-resistant, ceramic material which is physically inert at temperatures ranging as high as 1500° F–2000° F; such material has a hardness of greater than 8 on the Mohs hardness scale.

The filtering system includes a filter chamber into which the gas to be cleaned is circulated. The chamber contains the filtering medium through which the gas flows and is cleaned. The filtering medium can continuously be moved throught the filter chamber so that the filter does not have to be stopped for cleaning. A media entrainment chamber is provided where the filter medium is entrained with gas under pressure. The medium is moved by means of the entrained gas into a de-entrainment vessel where the entrained gas is vented and the filter medium is moved to a cleaning chamber. In the cleaning chamber a counter-flow cascade arrangement is provided where gas is circulated in the direction opposite to that in which the medium is moving for loosening ash on the filtering medium so that the ash can be carried away in the counter-flowing gas. The cleaned medium then flows into a slugging fluid bed where the final removal of the ash takes place by gas flowing through the medium. The level of medium is maintained within a pre-selected range for continuous redistribution into the filter chamber.

The filter chamber is designed so that minimum gas velocity is required to effect filtration, which in turn minimizes the pressure loss due to the gas flowing through filter medium. This results in smaller openings leading to and from the medium and reduces the possibility of particles of the filter medium being carried downstream by the gas. In addition, this relatively low velocity results in a porous low density ash buildup at the inlet to the filter material (as opposed to the dense hard buildup caused by a high velocity), which is easily removed.

BRIEF DESCRIPTION OF THE DRAWINGS

For a better understanding of the invention, reference may be had to the following description of a preferred embodiment, taken in conjunction with the accompanying drawings, in which.

DETAILED DESCRIPTION OF A PREFERRED EMBODIMENT

Now, a detailed description of a preferred embodiment of the inventive granular filter will be described in detail in conjunction with the drawings.

Figure 1:
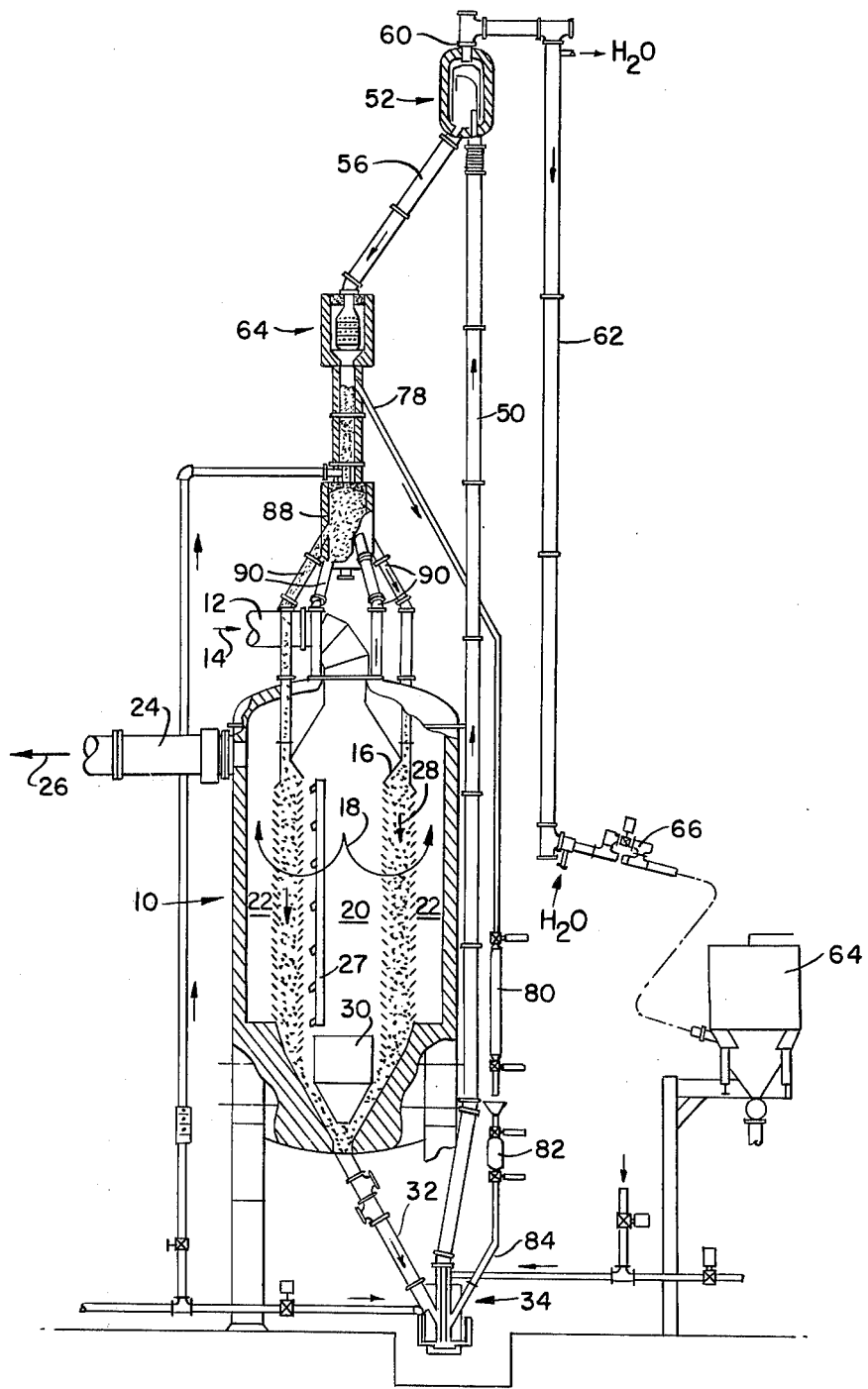
FIG. 1 is a diagrammatic view of the overall filter assembly.

Referring to FIG. 1, a diagrammatic view of the granular filter is shown where the filter chamber is designated by reference numeral 10. The filter chamber 10 includes the annular filter bed 16 which contains the filtering medium.

The filter medium is preferably aluminum oxide spheres which are approximately 0.08 inches in diameter. However, other materials which are resistant to high temperatures and physically inert at approximately 1500°-2000° F with a hardness of greater than 8 on the Mohs' hardness scale could also be used, for example, material such as silicon carbide ceramic materials. It is particularly important that the material not break down at high temperatures, which would add an additional contaminant to the gas stream, and also which does not react chemically with the particulate matter to be removed by the filter or with other products of combustion. Gas to be cleaned is introduced into the filter chamber 10 through the gas inlet 12 in the direction of the arrow 14. The gas enters the top of the filter chamber and moves downwardly, circulating through the filter bed 16 as shown by the arrows 18. As can be seen, the dirty gas flows into the inlet plenum 20, outwardly through the annular filter bed 16 and into the annular outlet plenum 22. The cleaned gas then turns upwardly and flows through the gas outlet 24 in the direction of the arrow 26.

The walls of the annular filter bed 16 which face both the inlet plenum 20 and the outlet plenum 22 contain a number of louvers 23 which operate to hold the filter medium and enable the gas to circulate through the medium. It has been found that louvers are preferable over screens or perforated plates because they provide the maximum open area possible through which the gas can flow and at the same time provide a wall thick enough to hold the medium and resist corrosion.

The annular design of the filter bed allows the dirty gas to pass through the filter bed at a relatively low velocity which minimizes the pressure loss due to the small openings of the outlet louvers. In addition, this low velocity also significantly reduces the possibility of bits of the filter medium being carried in the cleaned gas downstream which would have the effect of forming deposits and eroding turbine blades. With the approach velocity of the gas being relatively low, the ash buildup at the inlet louvers will be relatively porous with a low density. This buildup can easily be removed by a simple, periodic air blast from a series of pipes 27, although only one pipe is shown in FIG. 1. With the gas flowing downward into the filter chmaber and the air chamber from the pipe 27 being aimed in a downward direction, the dislodged ash will fall downward and can be removed along with the dirty filtering medium as will be discussed below.

The system has been used with gas containing 0.5-5.0 grains weight of ash/dry standard cubic foot of gas (gr/DSCF), e.g. 1000-10,000 parts per million weight of ash in dry gas. By using the inventive filtering system with a filter having a radial thickness of about 18 inches and a gas approach velocity to the inlet louver of about 100 feet per minute, the pressure drop across the filter was 0.5-1.0 psid. The system works effectively as shown by the fact that outlet gas which has been cleaned contains 0.02-0.06 gr/DSCF, e.g. 40-120 ppm weight of ash.

The filter system contains a medium circulation and cleanup system which is closed and allows for continuous regeneration of the medium. As shown by the arrow 28, the filter medium moves downward through the filter bed 16 and across the path of gas flow. The outlet cone 30 is located at the bottom of the filter bed and guides the medium into the outlet pipe 32. The cone 30 is hollow and allows ash and medium which spill from the inlet face of the annular filter bed to enter the outlet pipe. The outlet pipe 32 also operates to seal the chamber 10 and prevent gas from leaking from the circulation system into the filter.

Figure 2:
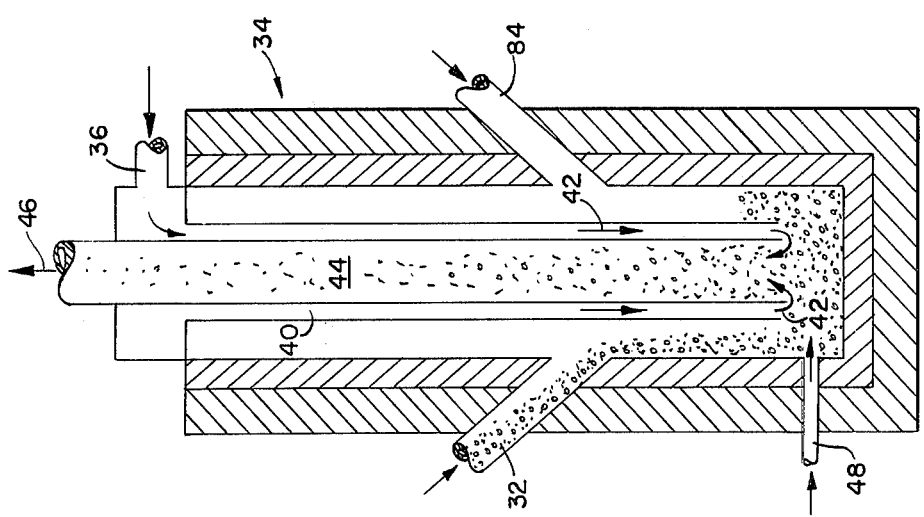
FIG. 2 is an enlarged sectional view of the entrainment chamber shown in FIG. 1.

The medium flows from the outlet pipe 32 into the entrainment chamber 34 which is shown in greater detail in FIG. 2. The entrainment chamber 34 operates to circulate the medium so that continuous regeneration can take place. The entrainment chamber 34 also controls the circulation rate of the medium by controlling the rate that transporting gas entrains and transports the medium.

The transporting gas is introduced into the entrainment chamber 34 through the primary gas pipe 36 and into the annulus 40. The gas flows downward through the annulus 40 into the bottom of the chamber as shown by the arrows 42. The gas entrains the filter medium, which enters the chamber through the inlet pipe 32, at the bottom of the chamber and the mixture of medium and gas flows upward through the central lift pipe 44 as shown by the arrow 46.

A plurality of radially mounted gas inlet pipes 48, around the entrainment chamber 34 are provided so that a small quantity of additional gas can be introduced into the entrainment chamber 34 for controlling the flow rate of the medium. By controlling the rate of flow of gas through the inlet pipes 48, the rate of flow of the filter medium through the lift pipe 44 can effectively be controlled. It has been found that this mode of transporting the medium from the filter to the cleaning stage, which will be discussed in greater detail below, requires a minimum of transport gas and requires a relatively low velocity of the medium. This in turn results in minimizing any fracture of the filter medium in downstream portions of the overall filtering system and also reduces wear in the piping.

Figure 3:
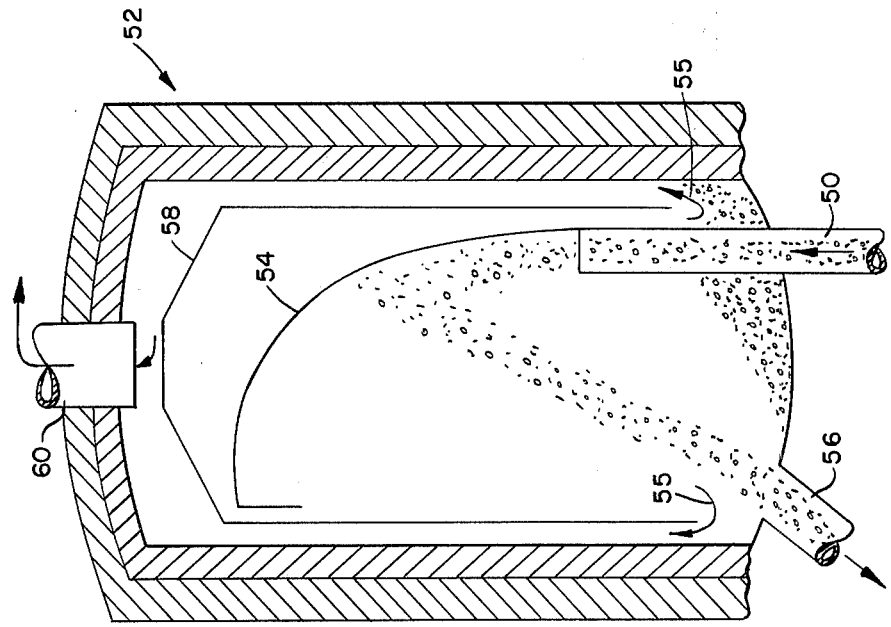
FIG. 3 is an enlarged sectional view of the deentrainment chamber shown in FIG. 1.

After the mixture of filter medium and gas leave the entrainment chamber 34, it travels upward through the lift pipe 50 and into the de-entrainment chamber 52, which is shown in detail in FIG. 3. The filter medium enters the de-entrainment chamber 52 and contracts the curved baffle 54 which is shaped and dimensioned to provide a relatively small angle of incidence of impact as the filter medium leaves the pipe 50. As the medium impacts the baffle 54 the medium gently decelerates and ash particles adhering to the medium are jarred loose. As can be seen in FIG. 3, the filter medium than falls by gravity toward the bottom of the de-entrainment chamber 52 and into the outlet pipe 56. The transporting gas, which is hot and contains particulate matter which has been jarred loose from the filter medium travels in the direction of the arrows 55 into the annular chamber formed by the baffle 58 and is vented through the outlet 60.

This gas is then transported through the water jacketed pipe 62 (see FIG. 1) into the bag house 64 where the particulate matter is removed. The valving arrangement 66 is provided to lower the pressure of the gas so that the bag house can be effective in removing the particulate matter.

This feature represents one of the significant advantages of the inventive system where filtration of a high volume, hot, high pressure gas stream is effected and the filtered particulate matter is delivered in a low volume, cool, low pressure gas stream to a small high efficiency bag house for final removal of the particulate matter. In pilot operations, for example, the filter chamber 10 effectively removes the particulate matter from 18,000 actual cubic feet of gas at 1600° F and 45 psig., whereas the bag house only has to filter 700 actual cubic feet of gas at 300° F at a significantly lower psig.

Figure 4:
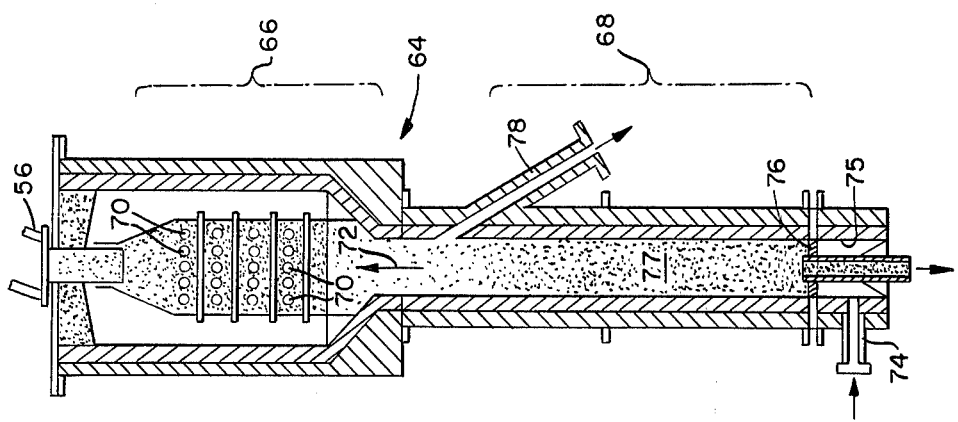
FIG. 4 is an enlarged sectional view of the media cleaning chamber assembly shown in FIG. 1.

The filter medium leaves the de-entrainment chamber 52 through the pipe 56, which is mounted at an angle to the vertical plane, and into the cleaning chamber assembly 64, which is shown in detail in FIG. 4. The cleaning chamber assembly 64 contains two zones, (1) the counter-flow cascade zone 67, (2) the slugging fluid bed 68.

In the counter-flow cascade zone, the filter medium cascades over a plurality of rows of bars 70 which project into the path along which the medium flows. As the medium falls by gravity over the bars 70, the impact loosens ash which is still adhering to the filter medium. As the ash is loosened, it is carried upward by gas flowing upwardly through the zone as indicated by the arrow 72, said gas entering at inlet 74. This gas also operates to provide a counterflow current against the medium as it flows down through the pipe 56 and is then vented through the outlet 60 of the de-entrainment chamber 52 for final removal of particulate matter from the gas as discussed above.

The filter medium falls by gravity from the counter-flow cascade zone 67 into the slugging fluid bed 68 where gas flows from the inlet 74, through the fluid bed plenum 75 and the distributor plate screen 76 to agitate the filter medium in a slugging action. This provides the final cleaning of the filter medium. It is emphasized that ash removed in the bed 68 and in zone 67 is carried upward to outlet 60 by the gas flow indicated by arrow 72.

The slugging fluid bed 68 also operates to provide an inventory of filter medium to be provided to the filter chamber 10. This is shown by the amount of filter medium accumulated as illustrated by reference numeral 77. The overfill drain 78 is provided to remove excess filter medium due to thermal expansion and to maintain a predetermined bed height suitable for continuous operation of the system.

The overfill pipe 78 leads to a drain airlock 80 which comprises two, high-temperature, pneumatically actuated slide valves (not shown) located in an airlock chamber. The airlock 80 operates to transport the excess filter medium into a hopper (not shown) without the loss of gas in the system.

The said storage hopper feeds filter medium into the entrainment chamber 34 through the fill airlock 82 and inlet pipe 84. The hopper can include a variable speed vibrating feeder operated by means for sensing reduced fluid bed differential pressure in the slugging fluid bed 68 when the height of the bed falls below a predetermined level. When this condition occurs additional filter medium is added to the entrainment chamber 34 through the airlock 82, which comprises two, high-temperature, pneumatically actuated slide valves for preventing gas from escaping from the system. The hopper also allows for periodic checking of the filter medium.

Referring back to FIG. 1, the cleaned filter medium flows into the distribution vessel 88 and through the six drain pipes 90 into the filter bed 16. The drain pipes 90 can be made thermally expandable to allow for system growth. The drain pipes 90, distribution vessel 88 and slugging fluid bed 77 are effective in providing an upper gas seal for the filter chamber 10, by virtue of the filter medium contained in said members.

Figure 5:
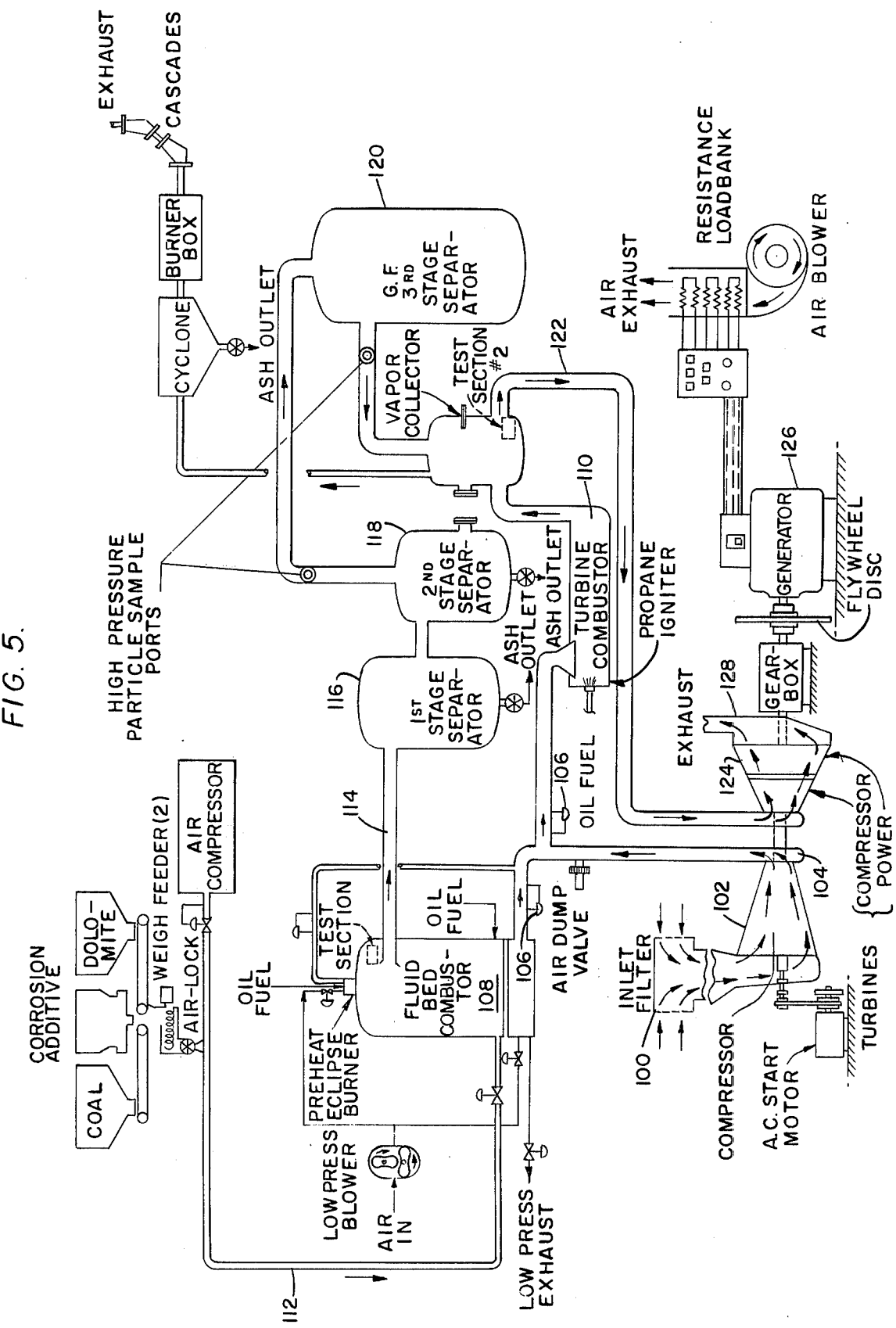
FIG. 5 is a diagrammatic view of a gas turbine system in which the novel granular filter can be used.

A combustion system utilizing a gas turbine for generating electricity in which the granular filter described in detail above can effectively be used is shown in FIG. 5. In this system, air is drawn from the atmosphere through the inlet filter 100, pressurized in the turbine compressor 102, and delivered to the compressor outlet piping manifold 104. The air travels in the direction indicated by the arrows to which no reference numerals are attached. The air control valves 106 direct the air flow either through the fluid bed combustor 108 or the turbine combustor 110. These two combustors permit flexibility since the fluid bed combustor 108 operates on coal and other solid fuels and the turbine combustor on oil.

As the air enters the fluid bed combustor 108, it flows up through a bed of granular material in the bottom of the combustor. The fuel used in the fluid bed combustor 108 is delivered through the inlet pipe 112 and is injected into the bottom of the bed of granular material through which the air is passing. In this way, the fuel is reacted within the bed.

The hot combustion gas produced by the burning fuel flows through the outlet pipe 114 into three particle separation stages 116, 118 and 120. The granular filter described in detail above, it should be noted, may be used to replace one or more of said separation stages 116, 118, 120. After most of the particulate matter is removed from the gas, it flows through the pipe 122 and expands through the gas turbine 124 to drive the compressor 102 and the generator 126. The spent and expanded gas exhausts to the atmosphere through the exhaust pipe 128.

Although not shown in FIG. 5, gas introduced into the entrainment chamber 34 through the inlet 36 is preferably supplied by the compressor 102. However, other sources could alternatively be provided.

The coal processing system and other elements of the flow chart shown in FIG. 5 will not be described in detail since captions have been provided which read together with the above description provide sufficient understanding of the system. It should be understood that the invention could be used in conjunction with other solid fuel processing systems. The first two separating stages 116, 118, can be of any suitable type of separating apparatus for initial cleaning of the air. For example, cyclones could be utilized. As discussed above, the granular filter which is the subject of this application provides the final and efficient cleaning of the gas used to turn the turbine.

Thus, there is provided in accordance with the invention a granular filter which can operate continuously for long periods of time at both high temperature and pressure. The filter operates at a high efficiency and is of a minimum size. Maximum protection to downstream equipment from deposits in the flow system and erosion to the turbine blade are prevented by the high efficiency and the prevention of the filter medium from entering the flowing gas stream.

Further, the system is designed to keep gas loss from the system at a minimum so that the flow-rate of the filter medium can effectively be controlled while regeneration takes place. A large contact area between the flowing gas and the moving filter medium has the effect of minimizing the pressure loss and velocity of the gas as it passes through the filter medium, thereby minimizing the speed at which the filter medium must move to be regenerated and still filter effectively. This also provides the advantage of keeping medium break-up at a minimum. In addition, the system used to remove the particulate matter adhering to the filter medium provides multiple impacts for more efficient cleaning of the filter medium along with a multi-stage cleaning.

The embodiment of the invention described above is intended to be merely exemplary, and those skilled in the art will be able to make modifications and variations without departing from the spirit and scope of the appended claims. All such modifications and variations are contemplated as falling within the scope of the claims.

We claim:

1. A continuously regenerating granular filter adapted for operation at high temperature and pressure comprising:
   a. a filter chamber adapted to operate at a positive pressure;
   b. a gas inlet and a gas outlet disposed in the wall of said chamber to enable gas to be cleaned to be admitted into the chamber and cleaned gas to be emitted from said chamber;
   c. a stationary filter bed disposed vertically in said chamber and located between the gas inlet and the gas outlet, said filter bed further comprising two vertical annular walls, each containing a plurality of louvers providing an inlet and an outlet surface for permitting gas to flow therethrough in a generally horizontal direction;
   d. a granular filter medium disposed in the space between the annular walls for cleaning said gas;
   e. the filter bed further including gas seal inlet means and gas seal outlet means located at each vertical end of said filter bed for simultaneously enabling the filter medium to move downwardly through the filter bed and preventing a gas from leaking into or out of the filter chamber;
   f. filter medium cleaning means for cleaning the filter medium disposed external to said filter chamber;
   g. filter medium circulating means associated with said gas seal outlet means and adapted to circulate the filter medium from said outlet means, through the cleaning means, to the gas seal inlet means, and downwardly through the filter bed, whereby the filter bed is continuously being provided with a clean supply of filter medium; and
   h. pressurized gas cleaning means in the filter chamber apart from and facing the inlet surface of the filter bed annular wall for periodically directing a gas under pressure downwardly at an angle against said inlet surface for cleaning deposits from said surface of the filter bed closest to the gas inlet, whereby said deposits are loosened from said inlet surface and fall downward where they are removed from the filter chamber through said gas seal outlet means.

2. The filter in claim 1, wherein the pressurized gas cleaning means includes a plurality of gas jets directed at said inlet surface, and means for supplying gas under pressure to the jets.

3. The filter in claim 1, wherein the gas seal outlet means includes a column packed with filter medium and the filter includes a bottom wall which is conical in shape and slopes downward, the filter bed being adapted so that the filter medium will flow therefrom onto said bottom wall by gravity, the filter chamber further including an outlet cone spaced apart from said bottom wall so that an opening is provided through which the filter medium can flow to said column and at the same time be tightly packed together to prevent gas leakage.

4. The filter in claim 1, wherein the circulating means includes inlet means for introducing gas under pressure to transport and clean said filter medium, gas outlet means for venting said gas under pressure from said filter, said gas outlet means includes gas cooling means for cooling said gas, gas pressure reducing means for reducing the pressure of said gas and gas cleaning means for cleaning said gas before final venting.

5. The filter in claim 1, wherein the filter medium is formed of a material which is physically inert at temperatures of 1500–2000° F and has a hardness of at least 8 on the Moh's hardness scale.

6. The filter in claim 5 wherein the filter comprises aluminum oxide spheres which are approximately 0.08 inches diameter.

7. The filter in claim 1, wherein the cleaning means includes a counter-flow cascade chamber, the counter-flow cascade chamber including an inlet at the top thereof for the introduction of filter medium, a plurality of rods in the chamber projecting into the path of flow of the filter medium, and gas means for introducing gas into the chamber to flow in the direction opposite that in which the filter medium is flowing.

8. The filter in claim 7, wherein said cascade chamber includes a slugging fluid bed at the bottom thereof for holding filter medium, the gas means being located below said bed so that gas will flow upward therethrough, and said cascade chamber including overfill outlet means between the rods and the slugging fluid bed for diverting the flow of filter medium when the slugging fluid bed reaches a predetermined level.

9. The filter in claim 1, wherein the circulating means includes an entrainment chamber employing a means to control the rate of medium entrainment, where the filter medium is entrained with gas under pressure from a first source and circulated to the cleaning means.

10. The filter in claim 9, and further including a de-entrainment chamber where the filter medium is separated from the gas and most of the ash particles without reducing the pressure of entraining gas to pressures significantly lower than system operating pressure.

11. The filter in claim 9, wherein the entrainment chamber includes a filter medium inlet adapted so that the filter medium will fall toward the bottom of the chamber, an outlet pipe extending from a predetermined distance from the bottom of the chamber upward out of the chamber, a primary gas inlet annulus surrounding the outlet pipe, the source of primary gas being connected to the annulus at the top thereof so that primary gas will flow downward through the annulus and upward through the outlet pipe after being entrained with the filter medium.

12. The filter in claim 11, wherein the entrainment chamber includes a plurality of nozzles opening into the space between the outlet pipe and the bottom of the chamber connected to a second source of gas under pressure for controlling the flow rate of the filter medium.

13. The filter in claim 12, wherein the de-entrainment chamber includes a curved baffle in the path of movement of the filter medium for engaging the filter medium with minimum impact and allowing it to fall downward by gravity toward the bottom of the chamber while the entrainment gas and substantially all of the ash pass vertically through said baffle.

14. The filter in claim 11, and further including venting means for venting the transporting and cleaning gas from the system, the venting means including means for cooling said gases, means for reducing the pressure of said gases and means for filtering said gases.

* * * * *